(12) United States Patent
Yoon et al.

(10) Patent No.: US 11,163,187 B2
(45) Date of Patent: Nov. 2, 2021

(54) BACKLIGHT UNIT AND DISPLAY APPARATUS USING THE SAME

(71) Applicant: LG Display Co., Ltd., Seoul (KR)

(72) Inventors: YongJoong Yoon, Paju-si (KR); JaeJung Han, Paju-si (KR); JinRyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/704,908

(22) Filed: Dec. 5, 2019

(65) Prior Publication Data
US 2020/0183222 A1 Jun. 11, 2020

(30) Foreign Application Priority Data
Dec. 6, 2018 (KR) .................. 10-2018-0155903

(51) Int. Cl.
*G02F 1/1333* (2006.01)
*G09G 3/36* (2006.01)
*G09G 3/34* (2006.01)
*G02F 1/1335* (2006.01)
*G02F 1/1343* (2006.01)
*G02F 1/1334* (2006.01)

(52) U.S. Cl.
CPC ...... *G02F 1/133371* (2013.01); *G02F 1/1334* (2013.01); *G02F 1/133524* (2013.01); *G02F 1/134336* (2013.01); *G09G 3/3426* (2013.01); *G09G 3/36* (2013.01); *G02F 2203/03* (2013.01); *G09G 2300/0421* (2013.01); *G09G 2310/08* (2013.01); *G09G 2320/0233* (2013.01)

(58) Field of Classification Search
CPC .................................................. G02F 1/133371
See application file for complete search history.

(56) References Cited

U.S. PATENT DOCUMENTS

| 5,648,859 | A | * | 7/1997 | Hirabayashi | ......... G02B 27/283 349/196 |
| 2002/0118464 | A1 | * | 8/2002 | Nishioka | ................ G02B 26/00 359/642 |
| 2009/0086507 | A1 | * | 4/2009 | Iwasaki | ................ G02B 6/0085 362/613 |
| 2012/0069063 | A1 | * | 3/2012 | Sato | ...................... H04N 13/356 345/690 |
| 2012/0154270 | A1 | * | 6/2012 | Numao | .................... H04N 5/72 345/156 |
| 2013/0033488 | A1 | * | 2/2013 | Takahashi | .............. H04N 13/32 345/419 |
| 2014/0232834 | A1 | * | 8/2014 | Sato | ...................... G09G 5/003 348/51 |

(Continued)

FOREIGN PATENT DOCUMENTS

JP S61103116 A * 5/1986 ............. G02B 23/26
KR 10-2013-0016065 A 2/2013

*Primary Examiner* — Sang V Nguyen
(74) *Attorney, Agent, or Firm* — Seed IP Law Group LLP

(57) ABSTRACT

Disclosed is a backlight unit including a light guide member including one side surface and the other side surface parallel to the one side surface, a light source module disposed on the one side surface of the light guide member, and a local dimming part disposed on the light guide member and including a liquid crystal layer, wherein the liquid crystal layer has an inclined surface disposed between the one side surface and the other side surface of the light guide member.

19 Claims, 11 Drawing Sheets

(56) References Cited

U.S. PATENT DOCUMENTS

| | | | | |
|---|---|---|---|---|
| 2015/0109763 A1* | 4/2015 | Shinkai | ............... | G02B 6/005 |
| | | | | 362/97.2 |
| 2015/0338670 A1* | 11/2015 | Hayashi | ............... | G02F 1/1347 |
| | | | | 349/57 |
| 2016/0085018 A1* | 3/2016 | Park | ............... | G02B 6/0083 |
| | | | | 362/606 |
| 2019/0162960 A1* | 5/2019 | Harada | ............... | G02B 6/0008 |

* cited by examiner

BACKLIGHT UNIT AND DISPLAY APPARATUS USING THE SAME

CROSS-REFERENCE TO RELATED APPLICATIONS

This application claims the benefit of the Korean Patent Application No. 10-2018-0155903, filed on Dec. 6, 2018, which is hereby incorporated by reference as if fully set forth herein.

BACKGROUND

Technical Field

The present disclosure relates to a backlight unit and a display apparatus using the same.

Description of the Related Art

Recently, with the advent of the information age, a display field for visually displaying electrical information signals has been rapidly developed, and in response to this, various display apparatuses having excellent performance such as small thickness, light weight, and low power consumption have been developed. Specific examples of such a display apparatus include a liquid crystal display apparatus, a field emission display apparatus, and a light emitting display apparatus.

In recent years, display apparatuses having a backlight unit adopt a local dimming technology to realize partial luminance, and a straight light is required to realize partial luminance. The backlight unit is divided into an edge type backlight unit and a direct type backlight unit depending on a position of a light source.

The direct type backlight unit may easily realize the local dimming technology but has a problem that a thickness increases according to an arrangement of light sources and cost for applying the local dimming technology increases.

The edge type backlight unit may reduce the thickness according to an arrangement of light sources but has difficulty in uniformly realizing luminance when the local dimming technology is applied.

BRIEF SUMMARY

Accordingly, the present disclosure is directed to providing a backlight unit that substantially obviates one or more problems due to limitations and disadvantages of the related art.

An aspect of the present disclosure is directed to providing a backlight unit which includes a local dimming unit disposed on a light guide member and having a liquid crystal layer having an inclined surface disposed between one side surface and the other side surface of the light guide member, thereby realizing uniform overall luminance in an edge-type backlight structure.

Another aspect of the present disclosure is directed to providing a backlight unit in which a thickness of a liquid crystal layer of a local dimming unit increases in a direction away from one side surface of a light guide member, thereby controlling partial luminance in a process of applying a local dimming technology.

Another aspect of the present disclosure is directed to providing a backlight unit which includes a liquid crystal layer having polymer dispersed liquid crystal and having an inclined surface, thereby easily controlling partial luminance for each of a plurality of local dimming blocks, and a display apparatus using the same.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and according to the purpose of the disclosure, as embodied and broadly described herein, there is provided a backlight unit including: a light guide member including one side surface and the other side surface parallel to the one side surface; a light source module disposed on the one side surface of the light guide member; and a local dimming part disposed on the light guide member and including a liquid crystal layer, wherein the liquid crystal layer has an inclined surface disposed between the one side surface and the other side surface of the light guide member.

In another aspect of the present disclosure, there is provided a display apparatus including: a backlight unit; and a display panel displaying an image using light irradiated from the backlight unit, wherein the backlight unit includes: a light guide member including one side surface and the other side surface parallel to the one side surface; a light source module disposed on the one side surface of the light guide member; and a local dimming part disposed on the light guide member and including a liquid crystal layer, wherein the liquid crystal layer has an inclined surface disposed between the one side surface and the other side surface of the light guide member.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
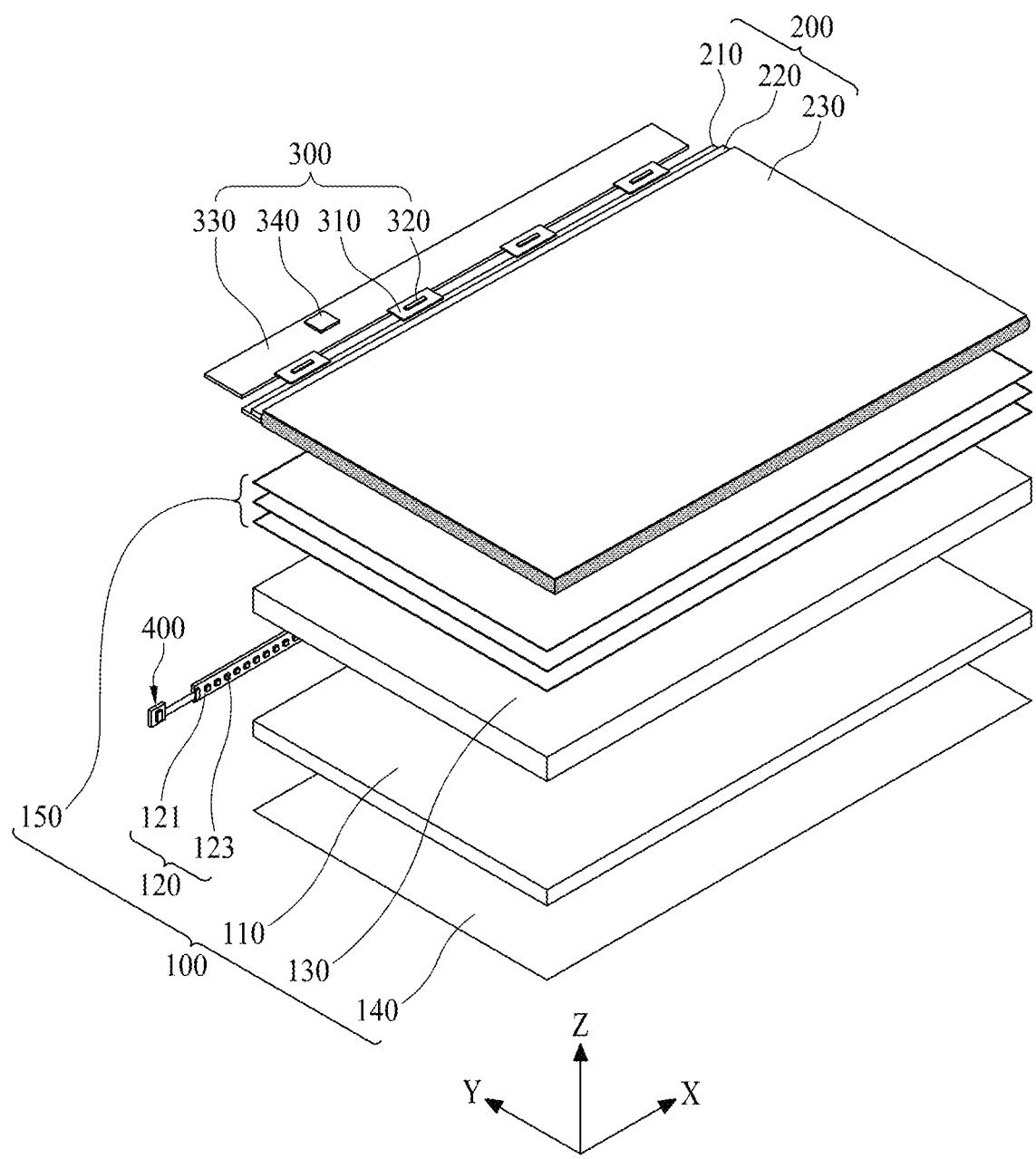
FIG. 1 is an exploded perspective view showing a display apparatus according to a first embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~,' 'over~,' 'under~,' and 'next~,' one or more other parts may be disposed between the two parts unless 'just' or 'direct' is used.

In describing a time relationship, for example, when the temporal order is described as 'after~,' 'subsequent~,' 'next~,' and 'before~,' a case which is not continuous may be included unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. The terms are merely for differentiating one element from another element, and the essence, sequence, order, or number of a corresponding element should not be limited by the terms. It will be understood that when an element or layer is described as being "connected," "coupled," or "adhered" to another element or layer, the element or layer can be directly connected or adhered to the other element or layer, but the other element or layer can be "disposed" between elements or layers, or elements or layers can be "connected," "coupled," or "adhered" to each other through the other element or layer.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, the present disclosure will be described with reference to the accompanying drawings and examples.

Figure 2:
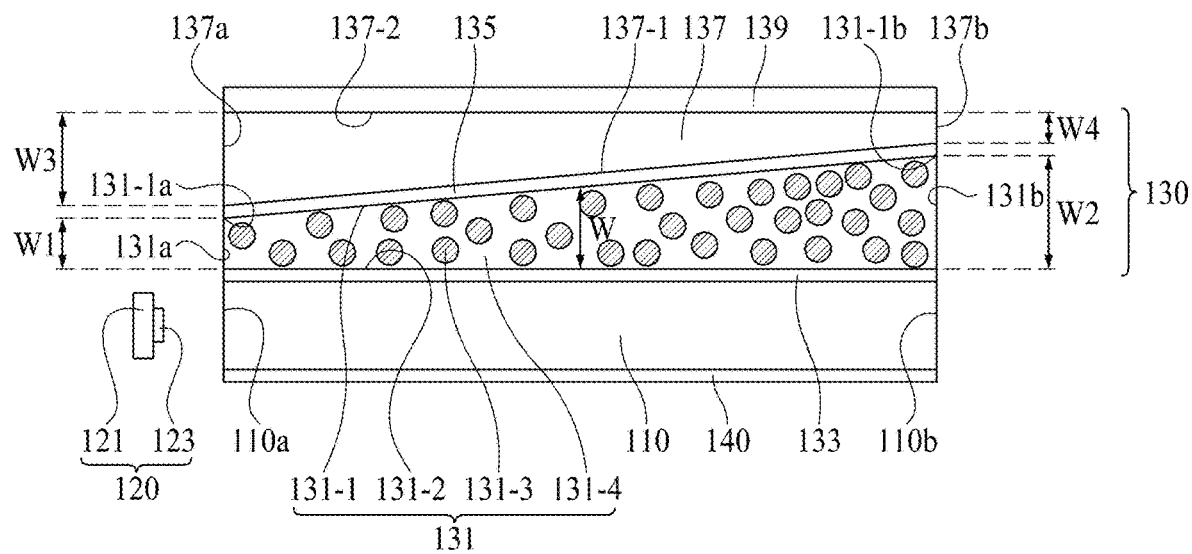
FIG. 2 is a cross-sectional view showing a local dimming part shown in FIG. 1.

FIG. 1 is an exploded perspective view showing a display apparatus according to a first embodiment of the present disclosure and FIG. 2 is a cross-sectional view showing a local dimming part shown in FIG. 1.

Referring to FIGS. 1 and 2, the display apparatus includes a backlight unit 100 (which may be referred to herein as a backlight unit 100), a display panel 200, a panel driving circuit assembly 300 (which may be referred to herein as a panel driving circuit assembly 300), and a backlight driving assembly 400 (which may be referred to herein as a backlight driving part 400).

The backlight unit 100 is disposed below the display panel 200 and may irradiate light toward the display panel 200.

The backlight unit 100 includes a light guide member 110, a light source module 120, a local dimming part 130 (which may be referred to herein as a local dimming part 130), a reflective sheet 140, and an optical sheet part 150.

The light guide member 110 may change a traveling path of a incident light from the light source module 120 and emit the light forward (or in a vertical axis direction Z). For example, the light guide member 110 may emit light toward the display panel 200.

According to an example, the light guide member 110 may be provided in a flat plate shape. That is, the light guide member 110 may be a rectangular parallelepiped having planar upper surface, lower surface, and four side surfaces. At least one of the four side surfaces of the light guide member 110 may be defined as a light entrance surface on which light is incident from the light source module 120, and an upper surface of the light guide member 110 may be defined as a light exit surface. The four sides of the light guide member 110 may include a pair of shorter sides parallel to each other and a pair of longer sides parallel to each other. The light guide member 110 may include a light-transmissive material. For example, the light guide member 110 may be formed of at least one material selected from polyesterimide, acrylonitrile styrene, polymethylpentene, polymethyl methacrylate, polystyrene, polyamide, polycarbonate, and polyethersulfone.

The light source module 120 may be disposed on at least one side surface of the light guide member 110 and the light source module 120 may irradiate a light to the light guide member 110. According to an example, the light source module 120 may include a printed circuit board (PCB) 121 and a plurality of light emitting members 123.

The PCB 121 may be disposed in parallel to the light entrance surface of the light guide member 110. That is, the PCB 121 may be disposed to overlap an edge portion of the light guide member 110. The PCB 121 may include at least one light source driving signal line (not shown), and the backlight driving part 400 may provide a light source driving signal through a connector connected to the light source driving signal line.

The plurality of light emitting members 123 may be disposed in parallel to each other and spaced apart from each other on one surface of the PCB 121 facing the light guide member 110. The plurality of light emitting members 123 may be connected to the light source driving signal line to receive the light source driving signal. For example, each of the plurality of light emitting members 123 may emit light simultaneously or individually according to the light source driving signal. According to an example, each of the plurality of light emitting members 123 may individually emit light according to a local dimming driving signal for partially controlling luminance of the light guide member 110.

According to an example, each of the plurality of light emitting members 123 may be configured as a chip-scale package and may be directly mounted on one surface of the PCB 121, and thus, the plurality of light emitting members 123 do not require a separate packaging process.

The local dimming part 130 may be disposed on the light guide member 110 to uniformly maintain luminance of the backlight unit 100. For example, the local dimming part 130 may control the incident light on the light entrance surface of the backlight unit 100 so that light may uniformly exit from the entire light exit surface. According to an example, the local dimming part 130 may be disposed on the light guide member 110 to change a total reflection path of light traveling in the backlight unit 100. For example, without the local dimming part 130 or a separate pattern, the light guide member 110 cannot allow the incident light to exit from the entire light exit surface. That is, the local dimming part 130 may distribute a light path evenly over the entire light exit surface of the backlight unit 100 by changing a total reflection path of light traveling in the backlight unit 100 into a refraction path and a reflection path. In other words, the local dimming part 130 may allow the incident light from the light source module 120 to uniformly emit to one side of the light exit surface of the backlight unit 100 adjacent to the light source module 120 and the other side of the light exit surface of the backlight unit 100 not adjacent to the light source module 120. Thus, although the light guide member 110 does not include a separate pattern, the local dimming part 130 may uniformly maintain luminance and optimize luminance uniformity over the entire light exit surface of the backlight unit 100.

The local dimming part 130 may include a liquid crystal layer 131, a first electrode 133, and a second electrode 135.

The liquid crystal layer 131 may include an inclined surface 131-1 disposed between a first side surface 110a (which may be referred to herein as one side surface 110a) and a second side surface 110b (which may be referred to herein as as the other side surface 110b) of the light guide member 110. Here, one side surface 110a of the light guide member 110 may correspond to a light entrance surface on which light is incident from the light source module 120. For example, a height W2 of the other side 131-1b of the inclined surface 131-1 corresponding to the other side surface 110b of the light guide member 110 may be greater than a height W1 of the one side 131-1a of the inclined surface 131-1 corresponding to the one side surface 110a of the light guide member 110. Here, a height W of the inclined surface 131-1 may correspond to a distance between a lower surface 131-2 of the liquid crystal layer 131 and the inclined surface 131-1. That is, the height W of the inclined surface 131-1 may correspond to a thickness of the liquid crystal layer 131.

For example, the height W1 of one side 131-1a of the inclined surface 131-1 corresponding to one side surface 110a of the light guide member 110 may correspond to 9 to 10 μm, and the height W2 of the other side 131-1b of the inclined surface 131-1 corresponding to the other side surface 110b of the light guide member 110 may correspond to 14 to 15 μm. The amount of the liquid crystal 131-3 of the liquid crystal layer 131 corresponding to the other side surface 110b of the light guide member 110 may be 1.5 times or more the amount of the liquid crystal 131-3 of the liquid crystal layer 131 corresponding to one side surface 110a of the light guide member 110.

The thickness W of the liquid crystal layer 131 may increase in a direction away from one side surface 110a of the light guide member 110. That is, the thickness of the liquid crystal layer 131 may increase in a direction away from the light source module 120. For example, the thickness W2 of the other side surface 131b of the liquid crystal layer 131 may be greater than the thickness W1 of the one side surface 131a of the liquid crystal layer 131. The amount of the liquid crystal 131-3 in the liquid crystal layer 131 may increase in a direction away from the one side surface 110a of the light guide member 110. In addition, as the amount of the liquid crystal 131-3 in the liquid crystal layer 131 increases, a haze level of the liquid crystal layer 131 increases since the number of times light scatters may increase. Here, the haze level may be inversely proportional to transparency of the liquid crystal layer 131 and may be proportional to the amount of the liquid crystal 131-3. For example, as transparency of the liquid crystal layer 131 increases, the haze level may be lower, and as the liquid crystal 131-3 increases, the haze level may be higher. That is, when voltage is not applied to the first and second electrodes 133 and 135, the haze level of the liquid crystal layer 131 may increase in a direction away from the one side surface 110a of the light guide member 110.

The liquid crystal layer 131 may be disposed between the first and second electrodes 133 and 135 and scatter light or allow light to be transmitted therethrough according to a magnitude of an electric field. For example, the liquid crystal layer 131 may be formed of a polymer dispersed liquid crystal including the liquid crystal 131-3 and a polymer matrix 131-4. Specifically, in the liquid crystal layer 131, a plurality of micro-sized liquid crystals 131-3 may be dispersed in the polymer matrix 131-4 and supported through the polymer matrix 131-4. When a voltage (e.g., a dimming voltage) is applied to the first and second electrodes 133 and 135, the liquid crystal 131-3 of the liquid crystal layer 131 may be arranged according to a direction of an electric field.

For example, when a voltage (e.g., a dimming voltage) is applied to the first and second electrodes 133 and 135, the optical axes of the liquid crystals 131-3 dispersed in the polymer matrix 131-4 may be aligned along the direction of the electric field. Here, refractive indexes of the liquid crystal 131-3 and the polymer matrix 131-4 are the same, and thus, the liquid crystal layer 131 may become transparent and the incident light in a thickness direction of the liquid crystal layer 131 may be transmitted through the liquid crystal layer 131, without being scattered. The incident light from the light source module 120 disposed on one side surface 110a of the light guide member 110 may be totally reflected within the light guide member 110 and the liquid crystal layer 131, as shown in FIG. 3B.

If a voltage (e.g., dimming voltage) is not applied to the first and second electrodes 133 and 135, the optical axes of the liquid crystal 131-3 dispersed in the polymer matrix 131-4 may not be aligned and cross each other. Here, the refractive indexes of the liquid crystal 131-3 and the polymer matrix 131-4 are different from each other, and thus, the liquid crystal layer 131 may become opaque and the incident light in the thickness direction of the liquid crystal layer 131 may be scattered in the liquid crystal layer 131. As a result, the incident light from the light source module 120 disposed on one side surface 110a of the light guide member 110 may be refracted and reflected at the interfaces between the liquid crystals 131-3 and the polymer matrix 131-4, as shown in FIG. 4B.

As described above, when a voltage (e.g., dimming voltage) is not applied to the first and second electrodes 133 and 135, the incident light from one side surface 110a of the light guide member 110 may be scattered more and more actively in a direction away from one side surface 110a of the light guide member 110. Therefore, when a voltage (e.g., dimming voltage) is not applied to the first and second electrodes 133 and 135, light that reaches a portion of the liquid crystal layer 131 adjacent to one side surface 131a is stronger but less scattered and thus less extracted outside due to total reflection, while light that reaches a portion of the liquid crystal layer 131 adjacent to the other side surface 131b is weaker but more scattered and thus more extracted outside, and thus, substantially the same level of light may be emitted in the entire region of the local dimming part 130. As a result, since the local dimming part 130 includes the liquid crystal layer 131 having the inclined surface 131-1, overall luminance may be uniformly realized in the edge-type backlight structure. The backlight driving part 400 selectively controls each of the plurality of light emitting members 123 and each of a plurality of first electrodes 133 of the local dimming part 130, so that partial luminance of the backlight unit 100 may be easily controlled and power consumption may be reduced. In addition, the backlight driving part 400 may uniformly maintain luminance of the entire region of the backlight unit 100 or may clearly distinguish a luminance difference between one region of the backlight unit 100 and the other region thereof.

The first electrode 133 may be disposed on one surface of the liquid crystal layer 131 and the second electrode 135 may be disposed on the other surface opposing the one surface of the liquid crystal layer 131. According to an example, the first electrode 133 and the second electrode 135 may be formed of a transparent conductive oxide (TCO) such as indium tin oxide (ITO) or indium zinc oxide (IZO).

The first electrode 133 may be disposed between the light guide member 110 and the liquid crystal layer 131. Specifically, the first electrode 133 may be disposed on the light guide member 110 and face the lower surface 131-2 of the liquid crystal layer 131. According to an example, the first electrode 133 may be divided to correspond to the plurality of local dimming blocks of the display panel 200. The plurality of divided first electrodes 133 may be insulated from each other and may be independently driven by the backlight driving part 400. For example, the plurality of first electrodes 133 may be two-dimensionally arranged on a plane and have a rectangular or square plane shape. Each of the plurality of first electrodes 133 may control the alignment of the corresponding portion of liquid crystal layer 131 upon receiving a dimming voltage according to local dimming data for each local dimming block.

The second electrode 135 may be disposed on the inclined surface 131-1 of the liquid crystal layer 131. Specifically, the second electrode 135 may be disposed on the inclined surface 131-1 of the liquid crystal layer 131 and face a lower surface of an adhesive member 137. According to an example, the second electrode 135 may be integrally formed as a one body to overlap all of the plurality of first electrodes 133. The backlight driving part 400 may easily control partial luminance of the backlight unit 100 by forming a potential difference between each of the plurality of first electrodes 133 and the second electrode 135 to correspond to each of the plurality of local dimming blocks of the display panel 200.

According to an example, the distance W between the first electrode 133 and the second electrode 135 may increase in a direction away from one side surface 110a of the light guide member 110. For example, the first electrode 133 and the second electrode 135 may be arranged in a non-parallel manner. That is, the distance W2 between the first and second electrodes 133 and 135 corresponding to the other side surface 110b of the light guide member 110 may be greater than the distance W1 between the first and second electrodes 133 and 135 corresponding to the one side surface 110a of the light guide member 110. Accordingly, the amount of the liquid crystal 131-3 existing between the first and second electrodes 133 and 135 may increase in a direction away from the one side surface 110a of the light guide member 110. In addition, as the amount of the liquid crystal 131-3 in the liquid crystal layer 131 increases, the number of times light scatters may increase and the haze level of the liquid crystal layer 131 increases. The haze level of the liquid crystal layer 131 may increase as the distance between the first and second electrodes 133 and 135 increases.

When a voltage (e.g., dimming voltage) is not applied to the first and second electrodes 133 and 135 as described above, light may be scattered more and more actively as the distance between the first and second electrodes 133 and 135 increases. Accordingly, by including the first and second electrodes 133 and 135 disposed on both sides of the liquid crystal layer 131 having the inclined surface 131-1, the local dimming part 130 may uniformly realize the overall luminance in the edge-type backlight structure.

The local dimming part 130 may further include the adhesive member 137 and a protective film 139.

The adhesive member 137 may be disposed on the second electrode 135 to planarize the upper portion of the local dimming part 130. Specifically, the adhesive member 137 may include one surface 137-1 parallel to the inclined surface 131-1 of the liquid crystal layer 131 and the other surface 137-2 opposing the one surface 137-1 of the adhesive member 137 and parallel to the lower surface 131-2 of the liquid crystal layer 131. For example, a height of the other side of the one surface 137-1 of the adhesive member 137 corresponding to the other side surface 110b of the light guide member 110 may be higher than a height of one side of the one surface 137-1 of the adhesive member 137 corresponding to one side surface 110a of the light guide member 110. Here, the height of one surface 137-1 of the adhesive member 137 may correspond to a distance between the lower surface 131-2 of the liquid crystal layer 131 and one surface 137-1 of the adhesive member 137. That is, since the one surface 137-1 of the adhesive member 137 is disposed on the inclined surface 131-1 of the liquid crystal layer 131, the height of the one surface 137-1 of the adhesive member 137 may increase as the height of the inclined surface 131-1 of the liquid crystal layer 131 increases.

A thickness of the adhesive member 137 may decrease in a direction away from one side surface 110a of the light guide member 110. That is, the thickness of the adhesive member 137 may decrease in a direction away from the light source module 120. Here, the thickness of the adhesive member 137 may correspond to a distance between one surface 137-1 of the adhesive member 137 and the other surface 137-2 thereof. For example, a thickness W3 of one side surface 137a of the adhesive member 137 may be greater than a thickness W4 of the other side surface 137b of the adhesive member 137. As described above, the one surface 137-1 of the adhesive member 137 may be disposed on the inclined second electrode 135, and the one surface 137-1 of the adhesive member 137 and the other surface 137-2 of the adhesive member 137 may be disposed not to be parallel to each other, whereby the adhesive member 137 may planarize the upper portion of the local dimming part 130.

The protective film 139 may be disposed on the other surface 137-2 of the planarizing adhesive member 137 to protect the local dimming part 130. According to an example, the local dimming part 130 may be implemented as a single module including the liquid crystal layer 131, the first and second electrodes 133 and 135, the adhesive member 137, and the protective film 139. The protective film 139 protects the upper surface of the local dimming part 130, while preventing loss of light passing through the local dimming part 130. For example, when the optical sheet part 150 is disposed on the local dimming part 130, the protective film 139 may be omitted. However, if the protective film is not provided, scratches or the like may occur on the upper surface of the local dimming part 130 due to physical contact between the upper surface of the local dimming part 130 and the optical sheet part 150, and a traveling path of light may be changed by the scratches. The protective film 139 is preferably provided on the upper surface of the local dimming part 130 to prevent loss of light passing through the local dimming part 130, while protecting the upper surface of the local dimming part 130.

The reflective sheet 140 may cover the lower surface of the light guide member 110. Specifically, the reflective sheet 140 may minimize loss of light by reflecting the incident light through one side surface 110a of the light guide member 110 to the inside of the light guide member 110.

The optical sheet part 150 may be disposed on the local dimming part 130 to improve luminance characteristics of the incident light through the upper surface of the local dimming part 130. For example, the optical sheet part 150 may include a diffusion sheet, a lower prism sheet, an upper prism sheet, and a dual brightness enhancement film, but not limited thereto and the optical sheet part 150 may include a stacked combination of three or more selected from the diffusion sheet, the prism sheet, a lenticular sheet, and the dual brightness enhancement film.

The display panel 200 may display a predetermined image using light emitted from the backlight unit 100 and include a lower substrate 210 and an upper substrate 220 adhered to each other in a facing manner with a liquid crystal layer interposed therebetween.

The lower substrate 210, which is a thin film transistor (TFT) array substrate, includes a plurality of pixels (not shown) formed at pixel regions formed where a plurality of gate lines (not shown) and a plurality of data lines (not shown) intersect each other. For example, each of the plurality of pixels may include a TFT (not shown) connected to a gate line and a data line, a pixel electrode connected to the TFT, and a common electrode formed adjacent to the pixel electrode and supplied with a common voltage.

For example, the lower substrate 210 may include a pad portion (not shown) provided at a lower edge of the lower substrate 210 and connected to a plurality of signal lines. The lower substrate 210 may further include an internal gate driving circuit part (not shown) provided at a left edge and/or a right edge of the lower substrate 210 and supplying gate signals to the gate lines of the display panel 200. Such internal gate driving circuit part may be formed together in a TFT manufacturing process of the plurality of pixels so as to be connected to each gate line.

The upper substrate 220 includes a pixel defining pattern that defines an opening region overlapping a plurality of pixel regions formed in the lower substrate 210 and a color filter formed in the opening region. The upper substrate 220 may be adhered by a sealant to the lower substrate 210 in a facing manner with a liquid crystal layer interposed therebetween so as to cover the entirety of the lower substrate 210 excluding the pad portion of the lower substrate 210.

According to an example, the display panel 200 may further include a lower polarizing member (not shown) having a first polarizing axis, and an upper polarizing member 230 having a second polarizing axis perpendicular to the first polarizing axis. The lower polarizing member may be disposed on a lower surface of the lower substrate 210 and the upper polarizing member 230 may be disposed on an upper surface of the upper substrate 220.

The panel driving circuit part 300 may divide the display panel 200 into a plurality of local dimming blocks and generate local dimming data for each block on the basis of input data for each block. Specifically, the panel driving circuit part 300 is connected to the pad portion provided on the lower substrate 210 to drive each pixel of the display panel 200, whereby the display panel 200 may display a certain color image. The panel driving circuit part 300 may include a plurality of flexible circuit films 310, a data driving IC 320, a source PCB 330, and a timing controller 340.

The plurality of flexible circuit films 310 may be attached between the pad portion of the lower substrate 210 and the source PCB 330 by a film attaching process. For example, the plurality of flexible circuit films 310 may be formed of tape carrier package (TCP) or chip on flexible board or chip on film (COF).

The data driving IC 320 may be mounted on each of the plurality of flexible circuit films 310. The data driving IC 320 may receive pixel data and a data control signal supplied from the timing controller 340, converts the pixel data into an analog data signal according to the data control signal, and supply the converted analog data signal to the data line of the lower substrate 210.

The source PCB 330 may be connected to the plurality of flexible circuit films 310. The source PCB 330 may provide the data driving IC 320 and the internal gate driving circuit with a signal necessary for displaying an image on the pixels of the display panel 200.

The timing controller 340 may be mounted on the source PCB 330 and receive a timing synchronization signal and digital image data supplied from an external display driving system (not shown), generate pixel data by aligning the digital image data to fit into a pixel arrangement structure of the display panel 200 on the basis of the received timing synchronization signal, and provide the generated pixel data to the data driving IC 320. Also, the timing controller 340 may control the data driving IC 320 and the internal gate driving circuit by generating a data control signal and a gate control signal on the basis of the timing synchronization signal, respectively.

The timing controller 340 may partially control luminance of light irradiated to the display panel 200 by controlling the backlight unit 100 through the backlight driving part 400 on the basis of the edge-type local dimming technology using the edge-type backlight unit. For example, the timing controller 340 may divide the display panel 200 into a plurality of local dimming blocks, analyze pixel data of the plurality of pixels included in each of the plurality of local dimming blocks to calculate local dimming data for each block, and control the backlight driving part 400 according to the calculated local dimming data for each block. Here, the local dimming data for each block may be an average gray level value for each block or a gray level value having a maximum frequency number for each block.

The backlight driving part 400 may cause the light source module 120 of the backlight unit 100 to emit light by generating a light source driving signal for each block according to the local dimming data for each block provided from the panel driving circuit part 300, i.e., the timing controller 340. That is, the backlight driving part 400 may receive the local dimming data for each block supplied from the timing controller 340 through a signal cable (not shown) and individually adjust a duty ratio of the light source driving signal for each block on the basis of the received local dimming data for each block to cause the light emitting member 123 of the light source module 120 to emit light according to the adjusted light source driving signal for each block. Accordingly, the light emitting members 123 of the light source module 120 may irradiate light to the light guide member 110 according to the light source driving signals for each block.

Figure 3A:
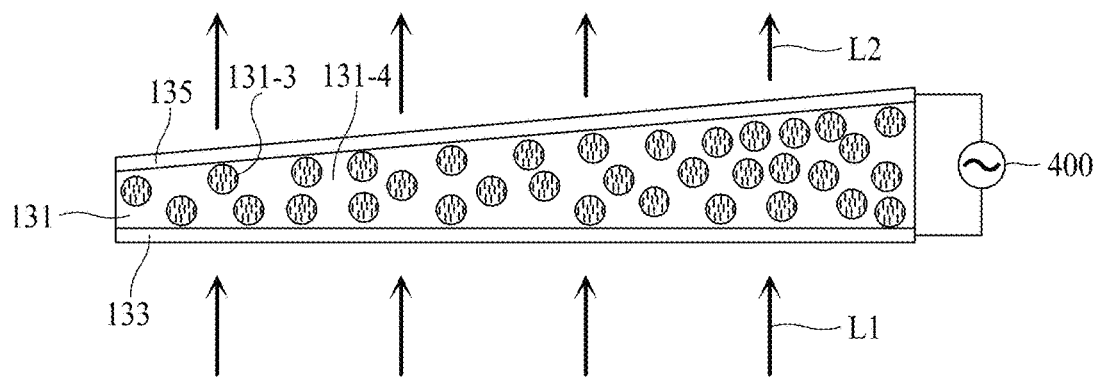
FIG. 3A is a view showing a state in which a voltage is applied to first and second electrodes of the local dimming part shown in FIG. 2.
Figure 3B:
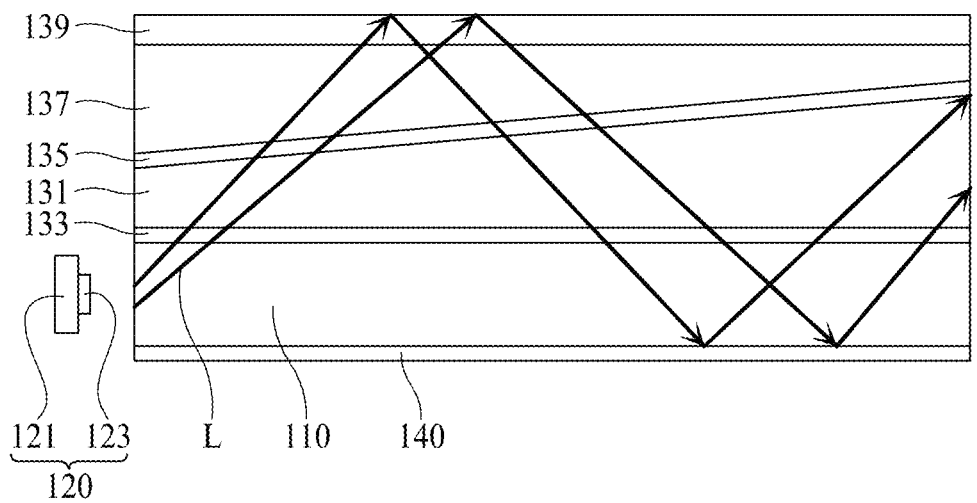
FIG. 3B is a view showing a total reflection of light in the backlight unit in a state shown in FIG. 3A.

FIG. 3A is a view illustrating a state in which a backlight driving voltage is applied to the local dimming part shown in FIG. 2. Specifically, FIG. 3A shows alignment of the liquid crystal 131-3 of the liquid crystal layer 131 in a case where a voltage (e.g., dimming voltage) is applied to the first and second electrodes 133 and 135 of the local dimming part 130. FIG. 3B shows a path in which light is totally reflected within the light guide member 110 and the local dimming part 130 in a case where a voltage is applied to the first and second electrodes 133 and 135 of the local dimming part 130.

Referring to FIG. 3A, when the first and second electrodes 133 and 135 receive a voltage (e.g., dimming voltage) from the backlight driving part 400, the liquid crystal 131-3 dispersed in the polymer matrix 131-4 may be aligned in a direction of an electric field. Here, refractive indexes of the liquid crystal 131-3 and the polymer matrix 131-4 are the same, and thus, the liquid crystal layer 131 may become transparent. Light L1 incident in the thickness direction of the liquid crystal layer 131 may be transmitted through the liquid crystal layer 131, without being scattered in the liquid crystal layer 131, and light L2 emitted from the liquid crystal layer 131 may be emitted in the same direction as the incident direction.

Referring to FIG. 3B, when the first and second electrodes 133 and 135 receive a voltage (e.g., a dimming voltage) from the backlight driving part 400, the incident light from the light source module 120 is not scattered in the liquid crystal layer 131. Here, the light guide member 110 and the local dimming part 130 may have the same refractive index. That is, the incident light from the light source module 120 disposed on one side surface 110a of the light guide member 110 may be totally reflected from each of the lower surface of the light guide member 110 and the upper surface of the protective film 139.

Figure 4A:
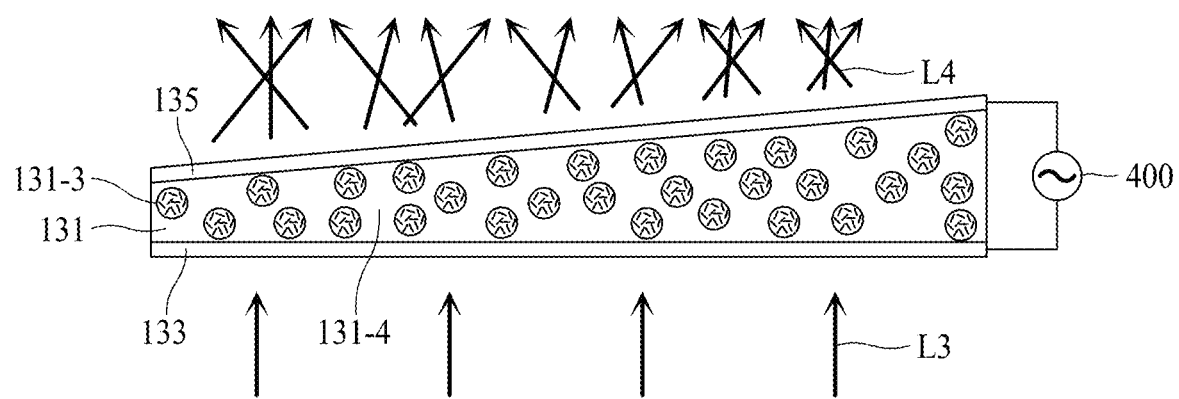
FIG. 4A is a view showing a state in which voltage is not applied to first and second electrodes of the local dimming part shown in FIG. 2.
Figure 4B:
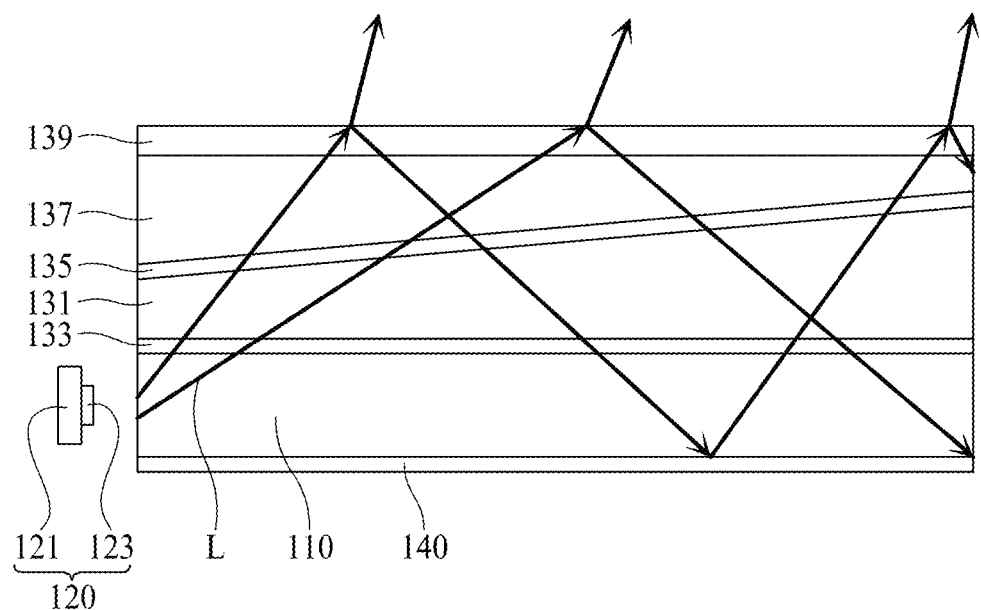
FIG. 4B is a view showing a refraction and reflection of light in the backlight unit in a state shown in FIG. 4A.

FIG. 4A is a view showing a state in which voltage is not applied to the first and second electrodes of the local dimming part shown in FIG. 2. Specifically, FIG. 4A shows the misalignment situation of the liquid crystal 131-3 of the liquid crystal layer 131 in a case where voltage (e.g., dimming voltage) is not applied to the first and second electrodes 133 and 135 of the local dimming part 130. FIG. 4B shows a path in which light is refracted and reflected within the light guide member 110 and the local dimming part 130 in a case where a voltage is not applied to the first and second electrodes 133 and 135 of the local dimming part 130.

Referring to FIG. 4A, when the first and second electrodes 133 and 135 do not receive a voltage (e.g., dimming voltage) from the backlight driving part 400, the liquid crystal 131-3 dispersed in the polymer matrix 131-4 may not be aligned and instead cross each other. Here, refractive indexes of the liquid crystal 131-3 and the polymer matrix 131-4 are different, and thus, the liquid crystal layer 131 may become opaque. Light L3 incident in the thickness direction of the liquid crystal layer 131 may be scattered in the liquid crystal layer 131. Accordingly, and light L4 emitted from the liquid crystal layer 131 may be emitted in a plurality of directions.

Referring to FIG. 4B, when the first and second electrodes 133 and 135 do not receive a voltage (e.g., a dimming voltage) from the backlight driving part 400, light L incident from the light source module 120 may be scattered in the liquid crystal layer 131. Here, the light guide member 110 and the local dimming part 130 may have the same refractive index. Thus, the light L incident from the light source module 120 disposed on one side surface 110a of the light guide member 110 may be totally reflected from the lower surface of the light guide member 110 and refracted and reflected from the upper surface of the protective film 139.

According to an example, the backlight driving part 400 may control luminance of the backlight unit by providing a voltage (e.g., dimming voltage) to the first electrode 133 corresponding to each of the plurality of local dimming blocks. For example, the backlight driving part 400 may prevent light from being emitted from a portion of the local dimming part 130 by providing a voltage to the first electrode 133 corresponding to the portion of the local dimming part 130, and allow light to be emitted from the other remaining portion of the local dimming part 130 without providing a voltage to the first electrode 133 corresponding to the other remaining portion of the local dimming part 130. Accordingly, the backlight driving part 400 according to the present disclosure may drive a plurality of light emitting members 123 on the basis of a light source driving signal for each of the plurality of local dimming blocks, and partially control luminance of the local dimming part 130 by controlling a haze level of the local dimming part 130.

For example, the backlight driving part 400 according to the present disclosure may minimize luminance of a portion of the local dimming part 130 by turning off the light emitting member 123 corresponding to the portion of the local dimming part 130 and/or providing a voltage to the first electrode 133 of the portion of the local dimming part 130. Also, the backlight driving part 400 according to the present disclosure may make luminance of the other portion of the local dimming part 130 uniform at a high level by turning on the light emitting member 123 corresponding to the other portion of the local dimming part 130 and not providing a voltage to the first electrode 133 disposed on one surface of the liquid crystal layer 131 including the inclined surface 131-1.

Figure 5:
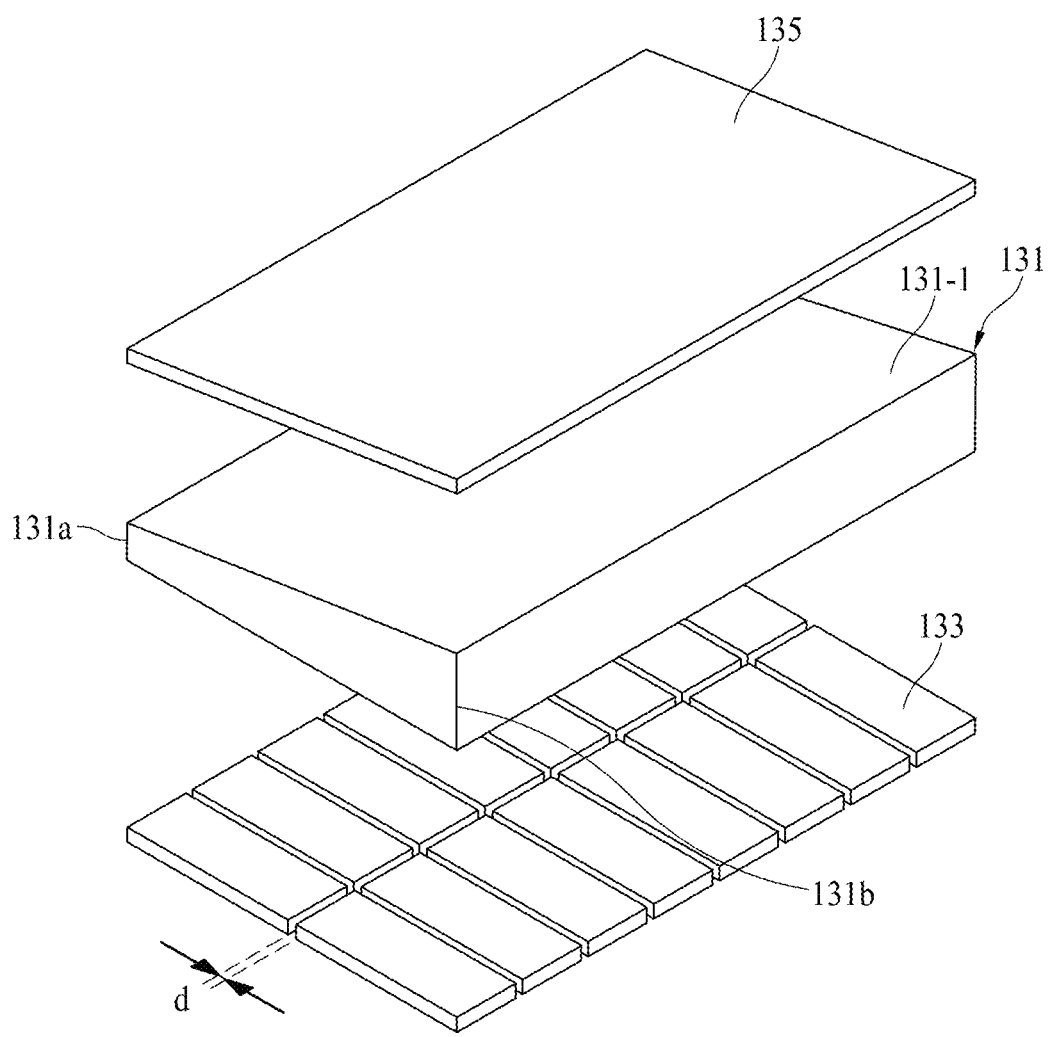
FIG. 5 is an exploded perspective view showing a configuration of the local dimming part shown in FIG. 2.

FIG. 5 is an exploded perspective view illustrating a configuration of the local dimming part shown in FIG. 2.

Referring to FIG. 5, the liquid crystal layer 131 may be disposed between the first and second electrodes 133 and 135 to scatter light or allow light to be transmitted therethrough according to a magnitude of an electric field. The liquid crystal layer 131 may include the inclined surface 131-1 disposed between one side surface 110a and the other side surface 110b of the light guide member 110.

The first electrode 133 may be disposed on the light guide member 110 and face the lower surface 131-2 of the liquid crystal layer 131. According to an example, the plurality of first electrodes 133 may be divided to respectively correspond to the plurality of local dimming blocks of the display panel 200. The plurality of first electrodes 133 may be spaced apart from each other by a predetermined distance d. For example, the distance between the plurality of first electrodes 133 may be 100 μm or less, and a boundary line of each of the plurality of local dimming blocks of the display panel 200 may not be shown. Therefore, the local dimming part 130 may uniformly realize overall luminance in the edge-type backlight structure. The plurality of divided first electrodes 133 may be insulated from each other and may be independently driven by the backlight driving part 400.

The second electrode 135 may be disposed on the inclined surface 131-1 of the liquid crystal layer 131. According to an example, the second electrode 135 may be integrally formed as a one body to overlap all of the plurality of first electrodes 133.

Figure 6:
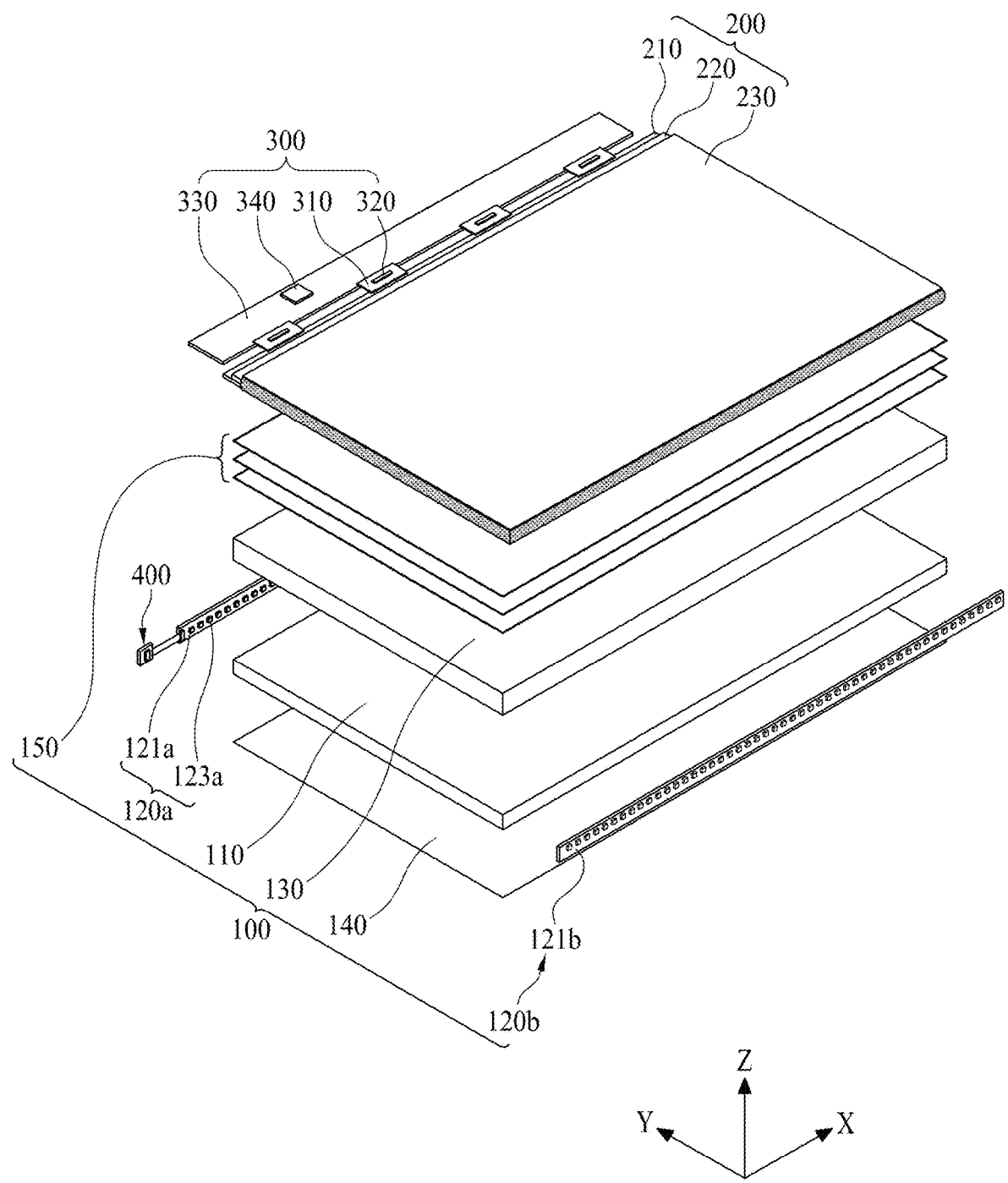
FIG. 6 is an exploded perspective view showing a display apparatus according to a second embodiment of the present disclosure.
Figure 7:
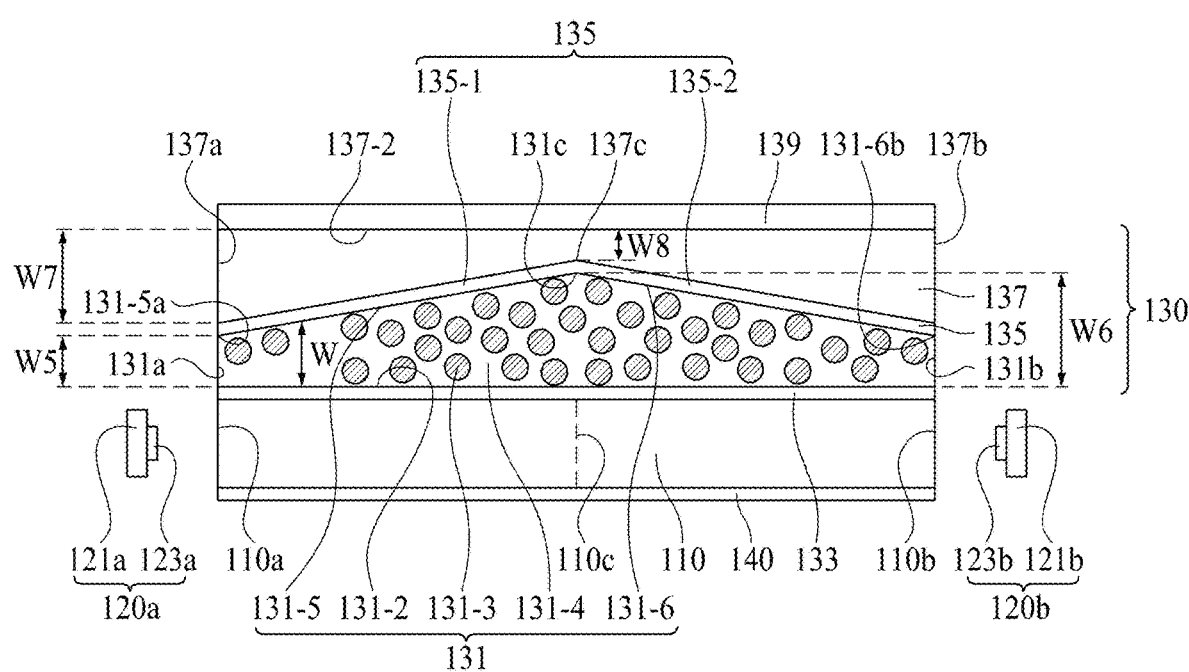
FIG. 7 is a cross-sectional view showing a local dimming part shown in FIG. 6.

FIG. 6 is an exploded perspective view showing a display apparatus according to a second embodiment of the present disclosure, and FIG. 7 is a cross-sectional view showing the local dimming part shown in FIG. 6. Here, the second embodiment of the present disclosure differs from the first embodiment in the configuration of the light source module 120 and the local dimming part 130, and the same configuration as the above-described configuration will be briefly described or omitted.

Referring to FIGS. 6 and 7, the backlight unit 100 includes a light guide member 110, light source modules 120a and 120b, a local dimming part 130, a reflective sheet 140, and an optical sheet part 150.

The light guide member 110 may change a traveling path of the incident light from the light source module 120 and emit light forward (or the vertical axis direction Z). For example, the light guide member 110 may emit light toward the display panel 200.

The light source modules 120a and 120b may be disposed on at least one side surface of the light guide member 110 and irradiate the light guide member 110 with light. According to an example, the light source module may include a first light source module 120a facing one side surface 110a of the light guide member 110 and a second light source module 120b facing the other side surface 110b of the light guide member 110. The first and second light source modules 120a and 120b may include first and second PCBs 121a and 121b and a plurality of first and second light emitting members 123a and 123b, respectively.

The local dimming part 130 may be disposed on the light guide member 110 to maintain luminance of the backlight unit 100 uniformly. For example, the local dimming part 130 may allow the incident light on the light entrance surface of the light guide member 110 to uniformly exit from the entire light exit surface. According to an example, the local dimming part 130 may cause the incident light from the first and second light source modules 120a and 120b to uniformly emit to one side and the other side of the light exit surface of the backlight unit adjacent to the first and second light source modules 120a and 120b, respectively, and a middle portion of the light exit surface of the backlight unit not adjacent to the first and second light source modules 120a and 120b. Accordingly, the local dimming part 130 may uniformly maintain luminance even when the light guide member 110 does not include a separate pattern and optimize luminance uniformity over the entire light exit surface of the backlight unit.

The local dimming part 130 may include a liquid crystal layer 131, a first electrode 133, and a second electrode 135.

The liquid crystal layer 131 may include a first inclined surface 131-5 disposed between one side surface 110a and the middle portion 110c of the light guide member 110 and a second inclined surface 131-6 disposed between the middle portion 110c and the other side surface 110b of the light guide member 110. Here, the one side surface 110a and the other side surface 110b of the light guide member 110 may correspond to a light entrance surface on which light is incident from the first and the second light source modules 120a and 120b, respectively. For example, a height W6 of the other side 131c of the first inclined surface 131-5 corresponding to the middle portion 110c of the light guide member 110 may be greater than a height W5 of one side 131-5a of the first inclined surface 131-5 corresponding to the one side surface 110a of the light guide member 110. Also, the height W6 of the one side 131c of the second inclined surface 131-6 corresponding to the middle portion 110c of the light guide member 110 may be greater than the height W5 of the other side 131-6b of the second inclined surface 131-6 corresponding to the other side surface 110b of the light guide member 110. Here, a height W of the first or second inclined surface 131-5 or 131-6 may correspond to a distance between a lower surface 131-2 of the liquid crystal layer 131 and the first or second inclined surface 131-5 or 131-6. That is, the height W of the first or second inclined surface 131-5 or 131-6 may correspond to a thickness of the liquid crystal layer 131.

For example, the height W5 of one side 131-5a of the first inclined surface 131-5 corresponding to one side surface 110a of the light guide member 110 may correspond to 9 to 10 and the height W6 of the other side 131c of the first inclined surface 131-5 corresponding to the middle portion 110c of the light guide member 110 may correspond to 14 to 15. The amount of the liquid crystal 131-3 of the liquid crystal layer 131 corresponding to the middle portion 110c of the light guide member 110 may be 1.5 times or more the amount of the liquid crystal 131-3 of the liquid crystal layer 131 corresponding to one side surface 110a of the light guide member 110.

The thickness W of the liquid crystal layer 131 may increase in a direction away from each of one side surface 110a and the other side surface 110b of the light guide member 110 and in a direction toward the middle portion 110c of the light guide member 110. That is, the thickness of the liquid crystal layer 131 may increase in a direction away from the first and second light source modules 120a and 120b. For example, the thickness W6 of the middle portion 110c of the liquid crystal layer 131 may be greater than the thickness W5 of each of one side surface 131a and the other surface 131b of the liquid crystal layer 131. The amount of the liquid crystal 131-3 in the liquid crystal layer 131 may increase in a direction away from the one side surface 110a and the other side surface 110b of the light guide member 110 and in a direction toward the middle portion 110c. In addition, as the amount of the liquid crystal 131-3 in the liquid crystal layer 131 increases, a haze level of the liquid crystal layer 131 increases since the number of times light scatters may increase. Here, the haze level may be inversely proportional to transparency of the liquid crystal layer 131 and may be proportional to the amount of the liquid crystal 131-3. For example, as transparency of the liquid crystal layer 131 increases, the haze level may be lower, and as the liquid crystal 131-3 increases, the haze level may be higher. That is, when voltage is not applied to the first and second electrodes 133 and 135, the haze level of the liquid crystal layer 131 may increase in a direction away from the one side surface 110a and the other side surface 110b of the light guide member 110 and in a direction toward the middle portion 110c.

The liquid crystal layer 131 may be disposed between the first and second electrodes 133 and 135 and scatter light or allow light to be transmitted therethrough according to a magnitude of an electric field. For example, the liquid crystal layer 131 may be formed of a polymer dispersed liquid crystal including the liquid crystal 131-3 and a polymer matrix 131-4. Specifically, in the liquid crystal layer 131, a plurality of micro-sized liquid crystals 131-3 may be dispersed in the polymer matrix 131-4 and supported through the polymer matrix 131-4. When a voltage (e.g., a dimming voltage) is applied to the first and second electrodes 133 and 135, the liquid crystal 131-3 of the liquid crystal layer 131 may be arranged according to a direction of an electric field.

According to an example, when a voltage (e.g., dimming voltage) is not applied to the first and second electrodes 133 and 135, the incident light from one side surface 110a and the other side surface 110b of the light guide member 110 may be scattered more and more actively in a direction away from one side surface 110a and the other side surface 110b of the light guide member 110. Therefore, when a voltage (e.g., dimming voltage) is not applied to the first and second electrodes 133 and 135, light that reaches a portion of the liquid crystal layer 131 adjacent to one side surface 131a and the other side surface 131b is stronger but less scattered and thus less extracted outside due to total reflection, while light that reaches a portion of the liquid crystal layer 131 adjacent to the middle portion 110c is weaker but more scattered and thus more extracted outside, and thus, substantially the same level of light may be emitted in the entire region of the local dimming part 130. As a result, since the local dimming part 130 includes the liquid crystal layer 131 having the first and second inclined surfaces 131-5 and 131-6, overall luminance may be uniformly realized in the edge-type backlight structure. The backlight driving part 400 selectively controls each of the plurality of light emitting members 123 and each of a plurality of first electrodes 133 of the local dimming part 130, so that partial luminance of the backlight unit 100 may be easily controlled and power consumption may be reduced. In addition, the backlight driving part 400 may uniformly maintain luminance of the entire region of the backlight unit 100 or may clearly distinguish a luminance difference between one region of the backlight unit 100 and the other region thereof.

The first electrode 133 may be disposed on one surface of the liquid crystal layer 131 and the second electrode 135 may be disposed on the other surface of the liquid crystal layer 131 opposing the one surface.

The first electrode 133 may be disposed between the light guide member 110 and the liquid crystal layer 131. Specifically, the first electrode 133 may be disposed on the light guide member 110 and face the lower surface 131-2 of the liquid crystal layer 131. According to an example, the first electrode 133 may be divided to correspond to the plurality of local dimming blocks of the display panel 200. The plurality of divided first electrodes 133 may be insulated from each other and may be independently driven by the backlight driving part 400. Each of the plurality of first electrodes 133 may control alignment of the corresponding portion of liquid crystal layer 131 upon receiving a dimming voltage according to local dimming data for each local dimming block.

The second electrode 135 may be disposed on the first and second inclined surfaces 131-5 and 131-6 of the liquid crystal layer 131. Specifically, the second electrode 135 may include a first electrode portion 135-1 disposed on the first inclined surface 131-5 of the liquid crystal layer 131 and a second electrode portion 135-2 disposed on the second inclined surface 131-6 of the liquid crystal layer 131. In this manner, the second electrode 135 may be disposed on the first and second inclined surfaces 131-5 and 131-6 of the liquid crystal layer 131 and face the lower surface of the adhesive member 137. According to an example, the second electrode 135 may be integrally formed as a one body to overlap all of the plurality of first electrodes 133. The backlight driving part 400 may easily control partial luminance of the backlight unit 100 by forming a potential difference between each of the plurality of first electrodes 133 and the second electrode 135 to correspond to each of the plurality of local dimming blocks of the display panel 200.

According to an example, the distance W between the first electrode 133 and the second electrode 135 may increase in a direction away from one side surface 110a and the other side surface 110b of the light guide member 110 and in a direction toward the middle portion 110c of the light guide member 110. For example, the first electrode 133 and the second electrode 135 may be arranged in a non-parallel manner. That is, the distance W6 between the first and second electrodes 133 and 135 corresponding to the middle portion 110c of the light guide member 110 may be greater than the distance W5 between the first and second electrodes 133 and 135 corresponding to the one side surface 110a and the other side surface 110b of the light guide member 110. Accordingly, the amount of the liquid crystal 131-3 existing between the first and second electrodes 133 and 135 may increase in a direction away from the one side surface 110a and the other side surface 110b of the light guide member 110 and in a direction toward the middle portion 110c. In addition, as the amount of the liquid crystal 131-3 in the liquid crystal layer 131 increases, the number of times light scatters may increase and the haze level of the liquid crystal layer 131 increases. The haze level of the liquid crystal layer 131 may increase as the distance between the first and second electrodes 133 and 135 increases.

When a voltage (e.g., dimming voltage) is not applied to the first and second electrodes 133 and 135 as described above, light may be scattered more and more actively as the distance between the first and second electrodes 133 and 135 increases. Accordingly, by including the first and second electrodes 133 and 135 disposed on both sides of the liquid crystal layer 131 having the first and second inclined surfaces 131-5 and 131-6, the local dimming part 130 may uniformly realize the overall luminance in the edge-type backlight structure.

The local dimming part 130 may further include an adhesive member 137 and a protective film 139.

The adhesive member 137 may be disposed on the second electrode 135 to planarize the upper portion of the local dimming part 130. Specifically, a thickness of the adhesive member 137 may decrease in a direction away from one side surface 110a and the other side surface 110b of the light guide member 110 and in a direction toward the middle portion 110c of the light guide member 110. That is, the thickness of the adhesive member 137 may decrease in a direction away from the first and second light source modules 120a and 120b. Here, the thickness of the adhesive member 137 may correspond to a distance between one surface of the adhesive member 137 and the other surface thereof. For example, a thickness W7 of each of one side surface 137a and the other side surface 137b of the adhesive member 137 may be greater than a thickness W8 of the middle portion 137c of the adhesive member 137. As described above, the one surface of the adhesive member 137 may be disposed on the inclined second electrode 135-1, 135-2, and the other surface 137-2 of the adhesive member 137 may be disposed not to be parallel to the one surface of the adhesive member 137, whereby the adhesive member 137 may planarize the upper portion of the local dimming part 130.

The protective film 139 may be disposed on the other surface of the planarized adhesive member 137 to protect the local dimming part 130.

Figure 8:
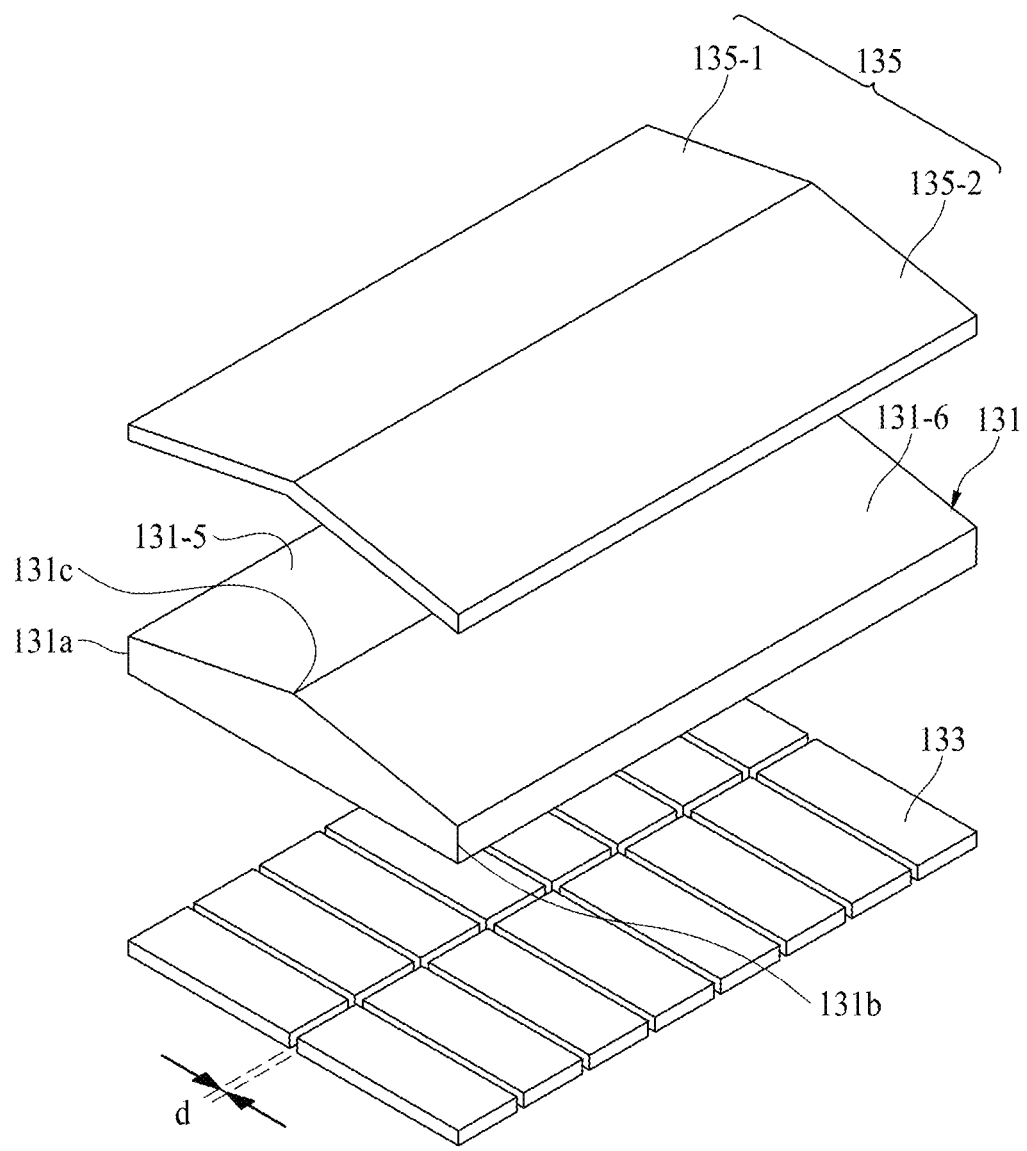
FIG. 8 is an exploded perspective view showing a configuration of the local dimming part shown in FIG. 7.

FIG. 8 is an exploded perspective view showing a configuration of a local dimming part shown in FIG. 7.

Referring to FIG. 8, the liquid crystal layer 131 may be disposed between the first and second electrodes 133 and 135 and allow light to be scattered or transmitted therethrough according to a magnitude of an electric field. The liquid crystal layer 131 may include a first inclined surface 131-5 disposed between one side surface 110a and the middle portion 110c of the light guide member 110 and a second inclined surface 131-6 disposed between the middle portion 110c and the other side surface 110b of the light guide member 110.

The first electrode 133 may be disposed on the light guide member 110 and face the lower surface 131-2 of the liquid crystal layer 131. According to an example, the plurality of first electrodes 133 may be divided to respectively correspond to the plurality of local dimming blocks of the display panel 200. The plurality of first electrodes 133 may be spaced apart from each other by a predetermined distance d. For example, the distance between the plurality of first electrodes 133 may be 100 μm or less, and a boundary line of each of the plurality of local dimming blocks of the display panel 200 may not be shown. Therefore, the local dimming part 130 may uniformly realize overall luminance in the edge-type backlight structure. The plurality of divided first electrodes 133 may be insulated from each other and may be independently driven by the backlight driving part 400.

The second electrode 135 may be disposed on the first and second inclined surfaces 131-5 and 131-6 of the liquid crystal layer 131. According to an example, the second electrode 135 may be integrally formed as a one body to overlap all of the plurality of first electrodes 133.

Figure 9A:
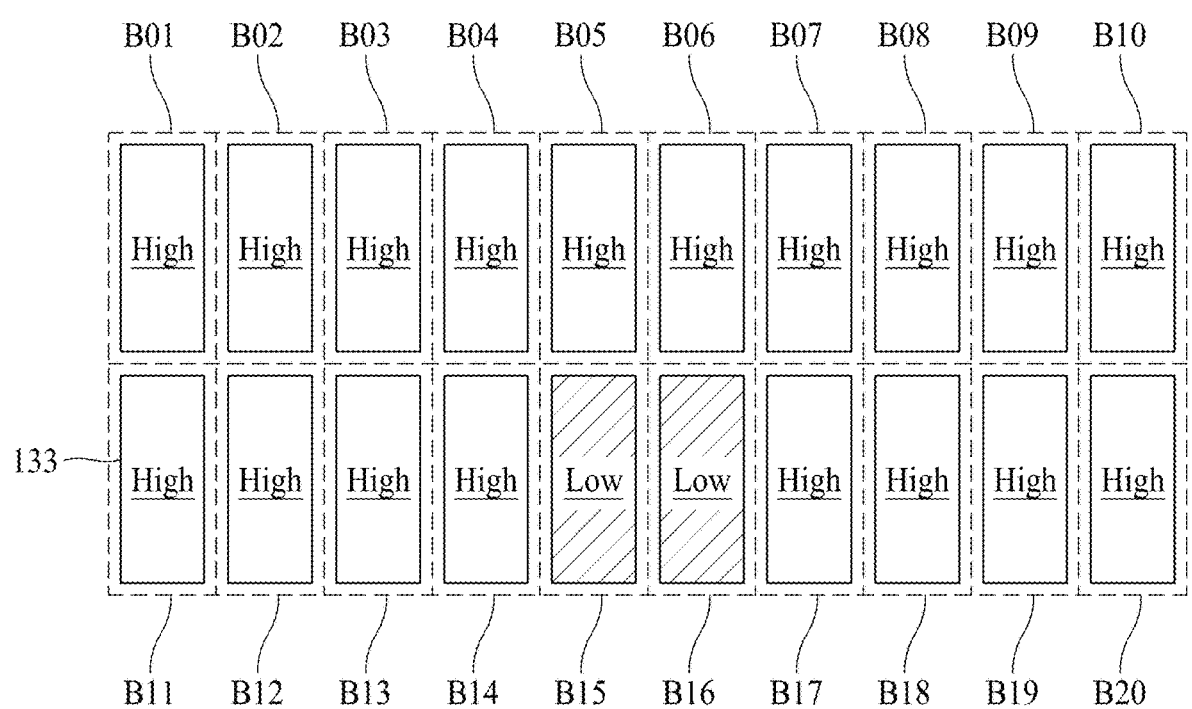
FIG. 9A is a view showing a process of individually driving each of a plurality of local dimming blocks in the display apparatus shown in FIG. 6.
Figure 9B:
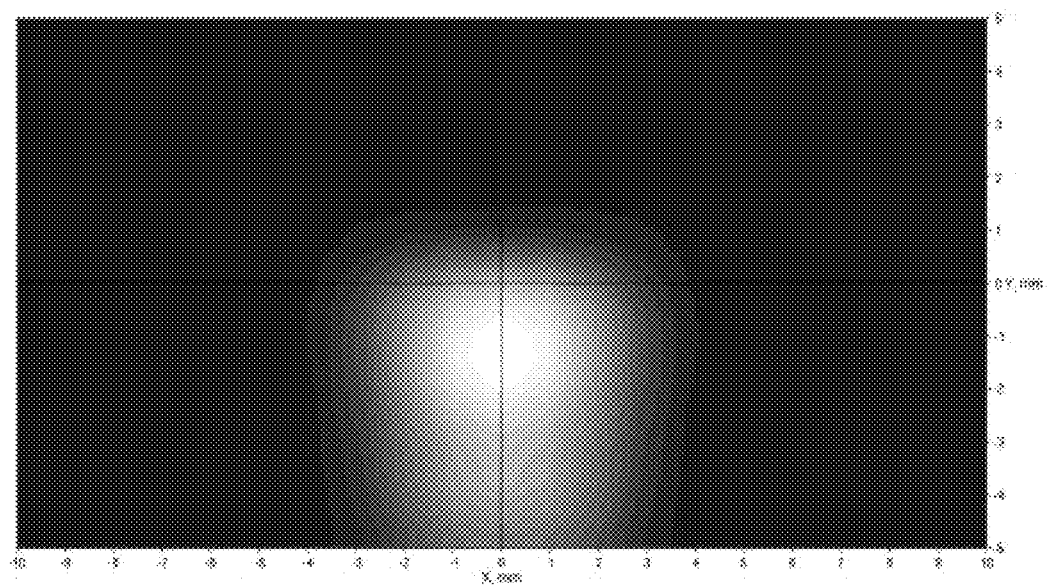
FIG. 9B is a view showing luminance of the local dimming part according to whether a voltage is applied to the first electrode.

FIG. 9A is a view illustrating a process of individually driving each of a plurality of local dimming blocks in the display apparatus shown in FIG. 6. Specifically, FIG. 9A is a view illustrating a state in which a voltage (e.g., dimming voltage) is provided to a portion of the first electrode 133 corresponding to a portion of local dimming blocks. FIG. 9B is a view showing luminance of the local dimming part 130 according to whether a voltage is applied to the first electrode 133.

Referring to FIG. 9A, the backlight driving part 400 may provide a low level voltage to the first electrode 133 corresponding to fifteenth block B15 and sixteenth block B16 among a plurality of local dimming blocks B01 to B20 of the display panel 200 and provide a high level voltage to the first electrode 133 corresponding to the other blocks B01 to B14 and B17 to B20 among the plurality of local dimming blocks B01 to B20. Also, the backlight driving part 400 may drive only the light emitting member 123 adjacent to the fifteenth block B15 and the sixteenth block B16 among the plurality of local dimming blocks B01 to B20 and may not drive the light emitting member 123 adjacent to the other blocks B01 to B14 and B17 to B20.

Referring to FIG. 9B, the liquid crystal layer 131 of the local dimming part 130 corresponding to the fifteenth block B15 and the sixteenth block B16 among the plurality of local dimming blocks B01 to B20 may refract and reflect the incident light from the light source module and maintain luminance uniformly at a high level in the fifteenth block B15 and the sixteenth block B16. Also, the liquid crystal layer 131 of the local dimming part 130 corresponding to the other blocks B01 to B14 and B17 to B20 among the plurality of local dimming blocks B01 to B20 may totally reflect the incident light from the light source module, thereby preventing light from being emitted and minimizing luminance.

Therefore, in the backlight unit 100 according to the present disclosure, a larger number of liquid crystals 131-3 of the liquid crystal layer 131 are arranged in a direction away from the light source module, and light which exits from the fifteenth block B15 and the sixteenth block B16 is prevented from entering the other blocks B01 to B14 and B17 to B20 by controlling alignment of the liquid crystal 131-3 of the liquid crystal layer 131 by applying a voltage to the first and second electrodes 133 and 135 and adjusting the number of times light is scattered. As a result, the backlight unit 100 according to the present disclosure may easily control partial luminance to correspond to each of the plurality of local dimming blocks and reduce power consumption.

Figure 10A:
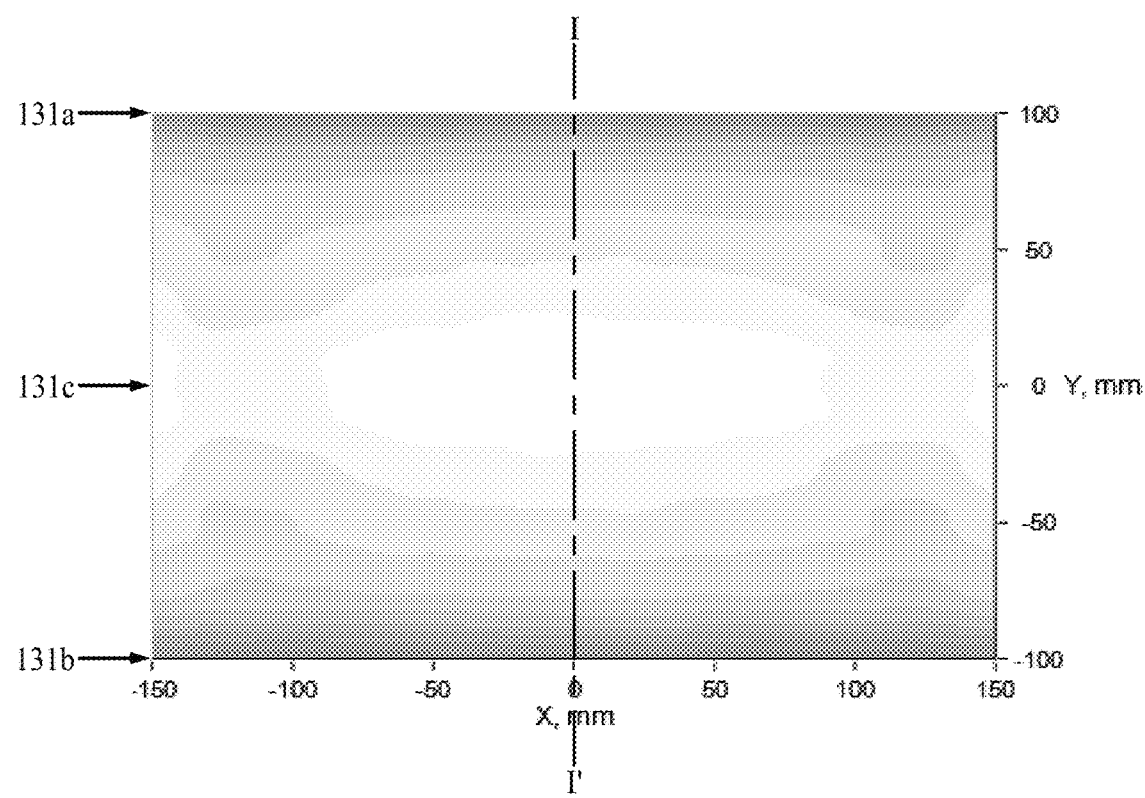
FIG. 10A is a view showing luminance uniformity of a backlight unit in the display apparatus shown in FIG. 6.

FIG. 10A is a view showing luminance uniformity of the backlight unit in the display apparatus shown in FIG. 6. Specifically, FIG. 10A shows luminance distribution for one side surface 131a, the other side surface 131b, and the middle portion 131c of the liquid crystal layer 131 and FIG. 10B shows normalized luminance intensity for cross-section taken along line I-I of FIG. 10A.

Figure 10B:
FIG. 10B shows normalized luminance intensity for cross-section taken along line I-I of FIG. 10A.

Referring to FIGS. 10A and 10B, when voltage is not applied to the first and second electrodes 133 and 135, luminance of light emitted from the middle portion 131c of the liquid crystal layer 131 is 1 [a.u.] and luminance of light emitted from one side surface 131a and the other side surface 131b of the liquid crystal layer 131 may be about 0.75 [a.u.]. In this way, the backlight unit 100 including the liquid crystal layer 131 having the inclined surface 131-5, 131-6 may maintain strong luminance in the region away from the light source module 120.

Therefore, since the local dimming part 130 of the backlight unit 100 according to the present disclosure includes the liquid crystal layer 131 having the first and second inclined surfaces 131-5 and 131-6, luminance of the one side surface 131a, the other side surface 131b, and the middle portion 131c of the liquid crystal layer 131 may be uniform to a high level.

The backlight unit according to the present disclosure includes the local dimming part disposed on the light guide member and having the liquid crystal layer having the inclined surface disposed between one side surface and the other side surface of the light guide member, thereby realizing uniform overall luminance in the edge-type backlight structure.

In the backlight unit according to the present disclosure, the thickness of the liquid crystal layer of the local dimming part increases in a direction away from one side surface of the light guide member, thereby controlling partial luminance in the process of applying the local dimming technology.

The backlight unit and the display apparatus using the same according to the present disclosure include the liquid crystal layer having the polymer dispersed liquid crystal and the inclined surface, thereby easily controlling partial luminance of each of the plurality of local dimming blocks.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit comprising:
a light guide member including a first side end surface and a second side end surface parallel to the first side end surface;
a light source module disposed on the first side end surface of the light guide member; and
a local dimming part disposed on the light guide member and including a liquid crystal layer,
wherein the liquid crystal layer of the local dimming part has an inclined surface disposed between the first side end surface and the second side end surface of the light guide member,
wherein a height of the inclined surface of the liquid crystal layer of the local dimming part continuously increases from the first side end surface to the second side end surface of the light guide member.

2. The backlight unit of claim 1, wherein the local dimming part further comprises:
a first electrode disposed between the light guide member and the liquid crystal layer; and
a second electrode disposed on the inclined surface of the liquid crystal layer.

3. The backlight unit of claim 1 wherein the inclined surface has a first side corresponding to the first side end surface of the light guide member and a second side corresponding to the second side end surface of the light guide member, the inclined surface having a second height at the second side of the inclined surface relative to the light guide member that is greater than a first height of the inclined surface at the first side relative to the light guide member.

4. The backlight unit of claim 1 wherein the liquid crystal layer of the local dimming part has a thickness that increases in a direction away from the first side end surface of the light guide member toward the second side end surface of the light guide member.

5. The backlight unit of claim 2 wherein the first electrode is spaced from the second electrode by a distance, the distance between the first electrode and the second electrode increasing in a direction away from the first side end surface of the light guide member toward the second side end surface of the light guide member.

6. The backlight unit of claim 2, further comprising:
an adhesive member disposed on the second electrode and planarizing an upper portion of the local dimming part.

7. The backlight unit of claim 6 wherein the adhesive member has a thickness that decreases in a direction away from the first side end surface of the light guide member toward the second side end surface of the light guide member.

8. The backlight unit of claim 1 wherein the liquid crystal layer of the local dimming part comprises a polymer dispersed liquid crystal including a polymer matrix and liquid crystals dispersed in the polymer matrix.

9. The backlight unit of claim 8 wherein an amount of the liquid crystal in the liquid crystal layer of the local dimming part increases in a direction away from the first side end surface of the light guide member toward the second side end surface of the light guide member.

10. A backlight unit comprising:
a light guide member including a first side end surface and a second side end surface parallel to the first side end surface and a middle portion between the first side end surface and the second side end surface;
a light source module disposed on the first side end surface of the light guide member;
a local dimming part disposed on the light guide member, the local dimming part including:
a liquid crystal layer having a first inclined surface disposed between the first side end surface and the middle portion of the light guide member and a second inclined surface disposed between the middle portion and the second side end surface of the light guide member;
a first electrode disposed between the light guide member and the liquid crystal layer; and
a second electrode disposed on the inclined surface of the liquid crystal layer,
wherein a height of the first inclined surface of the liquid crystal layer of the local dimming part continuously increases from the first side end surface to the middle portion of the light guide member, wherein a height of the second inclined surface of the liquid crystal layer of the local dimming part continuously increases from the second side end surface to the middle portion of the light guide member.

11. The backlight unit of claim 10, wherein the first inclined surface has a first side corresponding to the first side end surface of the light guide member and a second side corresponding to the middle portion of the light guide member, the first inclined surface having a second height at the second side of the first inclined surface relative to the light guide member that is greater than a first height of the first inclined surface at the first side relative to the light guide member.

12. The backlight unit of claim 11, wherein the second inclined surface has a first side corresponding to the middle portion of the light guide member and a second side corresponding to the second side end surface of the light guide member, the second inclined surface having a first height at the first side of the second inclined surface relative to the light guide member that is greater than a second height of the second inclined surface at the second side relative to the light guide member.

13. The backlight unit of claim 10, wherein the liquid crystal layer of the local dimming part has a thickness that increases in a direction away from the first side end surface and the second side end surface of the light guide member toward the middle portion of the light guide member.

14. The backlight unit of claim 10, wherein the first electrode and the second electrode are spaced by a distance, the distance between the first electrode and the second electrode increasing in a direction away from each of the first side end surface and the second side end surface of the light guide member toward the middle portion of the light guide member.

15. The backlight unit of claim 10, further comprising:
an adhesive member disposed on the second electrode and planarizing an upper end of the local dimming part,
wherein the adhesive member has a thickness that decreases in a direction away from the first side end surface and the second side end surface of the light guide member toward the middle portion of the light guide member.

16. The backlight unit of claim 10, wherein the liquid crystal layer of the local dimming part comprises a polymer dispersed liquid crystal including a polymer matrix and liquid crystals dispersed in the polymer matrix, and wherein an amount of the liquid crystal in the liquid crystal layer of the local dimming part increases in a direction away from the first side end surface and the second side end surface of the light guide member toward the middle portion of the light guide member.

17. A display apparatus comprising:
a backlight unit configured to irradiate light including:
a light guide member including a first side end surface and a second side end surface opposite the first side end surface;
a light source module disposed on the first side end surface of the light guide member, the light source module configured to irradiate light;
a local dimming part disposed on the light guide member and including a liquid crystal layer, wherein the liquid crystal layer of the local dimming part has an inclined surface disposed between the first side end surface and the second side end surface of the light guide member; and
a display panel disposed on the backlight unit, the display panel configured to display an image using the light irradiated from the backlight unit,
wherein a height of the inclined surface of the liquid crystal layer of the local dimming part continuously increases from the first side end surface to the second side end surface of the light guide member.

18. The display apparatus of claim 17, wherein the backlight unit further includes a printed circuit board, the display apparatus further comprising:
a panel driving circuit assembly dividing the display panel into a plurality of local dimming blocks and configured to generate local dimming data for each block of the plurality of local dimming blocks based on input data for each block; and
a backlight driving assembly connected to the printed circuit board of the backlight unit and configured to drive the light source module according to local dimming data corresponding to each local dimming block.

19. The display apparatus of claim 17, wherein the liquid crystal layer of the local dimming part has a first surface and a second surface opposite the first surface, the local dimming part further comprising:
a first electrode disposed on the first surface of the liquid crystal layer, the first electrode divided into a plurality of separate portions with each portion corresponding to one of the plurality of local dimming blocks; and
a second electrode disposed on the second surface of the liquid crystal layer, the second electrode including a single, unitary body.

* * * * *